Patented Nov. 29, 1949

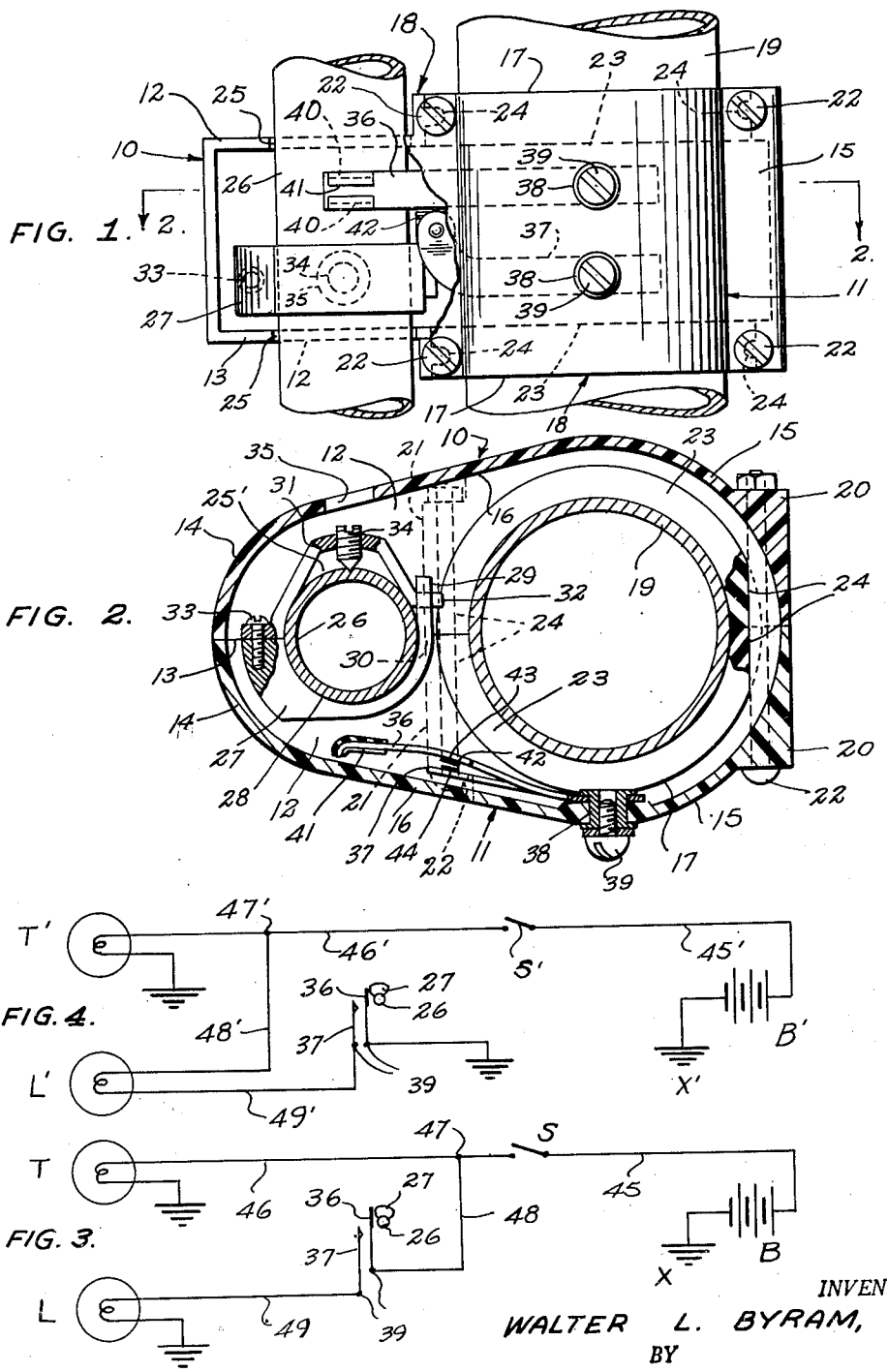

2,489,617

UNITED STATES PATENT OFFICE 2,489,617

ELECTRIC CONTROL DEVICE FOR SIGNAL LIGHTS ON AUTOMOTIVE VEHICLES

Walter L. Byram, Glendale, Calif.

Application September 30, 1947, Serial No. 776,878

2 Claims. (Cl. 200—59)

My invention relates to an electrical control device for signal lights on automotive vehicles.

An important object of the invention is to provide a control device to be mounted upon the steering column of an automobile, and having means operated by the movement of the gear shift column to open and close a switch in an electric circuit, such circuit including a signaling light therein.

A further object is to provide a control device of the above mentioned type, well adapted to control an auxiliary light at the rear of an automobile, to indicate when such automobile is traveling in reverse.

A further object is to provide a device of the character mentioned, which may be employed on any modern conventional make of automobile.

A still further object of the invention is to provide a control device for back-up lights on automobiles, which is simple and durable in design, positive in operation, and economical to manufacture.

Other objects and advantages of the invention will be apparent during the course of the following description.

In the accompanying drawings, forming a part of this application, and in which like numerals are employed to designate like parts throughout the same, Figure 1 is a side elevation of the electrical control device embodying the invention, and showing the same mounted upon the steering column of an automobile.

Figure 2 is a horizontal section taken on line 2—2 of Figure 1, parts broken away.

Figure 3 is a diagrammatic view of an electric circuit involved in the invention.

Figure 4 is a similar diagrammatic view showing a modification of the electric circuit.

In the drawings, where for the purpose of illustration are shown preferred embodiments of the invention, attention is first called to Figures 1 to 3, inclusive, wherein the numerals 10 and 11 designate companion casing sections, preferably formed of a suitable non-conducting plastic material. The companion casing sections 10 and 11 are U-shaped in transverse cross-section, and each comprises flat sides 12, having inner straight longitudinal edges 13 which register in assembly. Each casing section further comprises curved ends 14 and 15, connected by an inclined wall 16, integral therewith. Near its end 15, each casing section is provided with laterally outwardly projecting semi-circular flanges 17, which are in axial alignment, and integral with the sides 12. When the casing sections are brought together in assembly, the flanges 17 register to form axially aligned lateral hubs 18. The hubs 18 form a transverse opening to receive the steering column 19 of an automobile therein, and the control device is rigidly mounted upon the steering column, as will be fully explained. Corner bosses 20 are provided upon each casing section, adjacent to its end 15, and additional bosses 21 are formed on each casing section, tangent to the inner side of the flange 17. The bosses 20 and 21 of each casing section are adapted to register with the corresponding bosses of the companion casing section in assembly, and the bosses have openings to receive through bolts 22, or the like, serving to rigidly clamp the casing sections 10 and 11 to the steering column 19.

Semi-circular plastic inserts or shims 23 are provided, and disposed within the annular space between the hub 18 and steering column 19. These inserts may be provided with various radial thicknesses, so that the casing sections can be clamped upon steering columns of various diameters, on different makes of automobiles. The outside radii of the various sizes of inserts 23 are the same in all cases, but the inside radii may vary. When the inserts or shims 23 are in place, the bolts 22 are tightened, and the device is thereby securely mounted upon the automobile steering column 19. The inserts or shims have tangential grooves 24 in their sides near the bolts 22, to receive said bolts therein. This arrangement serves to positively hold the inserts 23 in their proper positions.

Formed in the sides 12 of each casing section, and near the ends 14 thereof, are semi-circular openings or recesses 25, adapted to register in assembly to form axially aligned openings 25'. These aligned openings 25' are adapted to receive a rotatable and axially shiftable gear shift column 26 therein, and the diameters of the openings 25' are larger than the outside diameter of the gear shift column 26. The sizes of the openings 25' are such that they may receive the gear shift column of any standard make of automobile. The center distance between the steering column and gear shift column differs among various standard makes of automobiles, and this may be compensated for by making the openings 25' larger, or by making the inside radii of the inserts 23 eccentric with respect to the hubs 18. In any case, the gear shift column 26 is freely rotatable and axially shiftable within the openings 25', and extends through the casing comprising the companion casing sections 10 and 11.

Adjustably rigidly mounted upon the gear shift column 26, and disposed within the casing, between the sides 12, is a contact actuator or cam 27. This cam has a circularly curved recess 28, to engage the column 26, and includes an extension 29, having a transverse opening 30. A clamp or strap 31 engages over the side of the column 26 opposite the cam, and this clamp has a lateral extension 32 to engage in the opening 30. The opposite end of the clamp 31 is rigidly attached to the cam 27 by means of a screw 33. The clamp 31 carries an adjusting set screw 34, to adjustably rigidly clamp the cam 27 to the gear shift column 26. An opening 35 is provided in the casing section 10, adjacent to the set screw 34. When the device is assembled onto the steering column 19, and the gear shift is in neutral, the cam 27 is properly adjusted by aligning the set screw 34 with the opening 35.

Disposed within the casing section 11, near the side 16 thereof, are laterally spaced resilient contact arms 36 and 37. Each of these arms is attached to the casing section 11 by means of tubular internally screw threaded rivets 38. These rivets 38 constitute the electrical terminals of the device, and receive terminal screws 39 therein, for electrical connection with wires of an automobile lighting circuit, not shown in Figures 1 and 2. The contact arm 36 is straight, and parallel to the sides 12, as viewed in Figure 1, and it extends longitudinally within the casing and has its free end disposed near the cam 27 for coaction therewith. The arm 36 has a pair of side notches 40 near its free end, and disposed within these notches 40 and surrounding the arm 36 adjacent thereto is a strip of hard insulating material 41, to engage the cam 27 when the same rotates counter-clockwise, as viewed in Figure 2. The end of the arm 36 is crimped over upon the insulating strip, 41, to secure the same to the arm 36, Figure 2. The arm 36 carries a lateral extension 42, preferably formed integral therewith, and disposed upon the bottom side of the extension 42, Figure 2, is an electrical contact element 43. The contact arm 37 is shorter than the contact arm 36, and L-shaped, Figure 1. This arm carries a contact element 44 at its free end to make electrical contact with the element 43. As viewed in Figure 2, the contact element 43 is disposed above the contact element 44.

The operation of the electrical control device is as follows.

With the device mounted upon the steering column 19, and the gear shifting mechanism in neutral, the cam 27 assumes the position relative to the contact arm 36 shown in Figures 1 and 2. When the automobile is shifted into reverse, the gear shift column 26 first moves upwardly, Figure 1, until the cam 27 is disposed directly beneath the arm 36. The gear shift lever, not shown, then causes the column 26 to rotate counter-clockwise, Figure 2, and the cam 27 engages the insulator strip 41, and moves the element 43 into electrical contact with the element 44. As long as the automobile is in reverse, the elements 43 and 44 make electrical contact to close an electric circuit and cause a signal light to glow at the rear of the automobile. It should be noted that both the steering column 19 and gear shift column 26 are electrically insulated from the contact arms 36 and 37.

Referring to Figure 3 of the drawings, an electrical circuit is shown, wherein the letter B designates the automobile battery grounded at X, and connected through a wire 45 with one terminal of the manually operated light switch S of the automobile. The opposite terminal of the light switch S is connected through a wire 46 with the tail-light T, which has its socket grounded. The wire 46 is electrically connected at 47 with a wire 48, in turn electrically connected with the contact arm 36. (The wire 36 is electrically connected with the terminal screw 39 of the arm 36.) A back-up light L has its socket grounded, and is electrically connected through a wire 49 with the contact arm 37. (The wire 49 is electrically connected with the terminal screw 39 of the arm 37.) When the light switch S is closed, current flows from the battery B, through the wire 45, switch S, wire 46, and tail-light T, to ground. Battery potential is standing at the contact arm 36, and when the cam 27 rotates counter-clockwise, Figures 2 and 3, the arm 36 makes electrical contact with the arm 37. When this occurs, current simultaneously flows from the battery, through wire 45, through switch S, wire 46, contact arms 36 and 37, wire 49, and back-up light L, having its socket grounded.

In Figure 4, a modified form of circuit is shown, wherein a double contact type back-up light bulb L' is employed. In this circuit, B' indicates the automobile storage battery, grounded at X'. This battery is electrically connected through a wire 45', through the automobile light switch S', and wire 46' with a tail-light bulb T', having its socket grounded. A wire 48' is connected with the wire 46', as at 47', and the wire 48' is connected with one terminal of the double contact back-up light bulb L'. The other terminal of the light bulb L' is connected through a wire 49' with the contact arm 37. The contact arm 36 is grounded, as shown in Figure 4. In this circuit, when the switch S' is closed, current flows from the battery B', through wire 45', switch S', wire 46' and through the tail-light T' to light the same. At the same time, battery potential stands at the contact arm 37, and when the cam 27 rotates counter-clockwise, the contact arm 36 engages the contact arm 37, and the back-up light L' will glow.

It is to be understood that the forms of the invention herewith shown and described, are to be taken as preferred examples of the same, and that various changes in the shape, size and arrangement of parts may be resorted to, without departing from the spirit of my invention, or the scope of the sub-joined claims.

Having thus described my invention, I claim:

1. A steering column mounted switch mechanism adapted to close a circuit only when a gear shifting shaft paralleling said steering column is moved endwise and rotated to a selected gear shifting position, said switch comprising a hollow casing embracing said steering column and said shaft, mounting means within said casing adapted to be constricted on the steering column to mount the casing in a fixed position thereon, said casing including top and bottom walls formed with aligned openings freely passing said gear shifting shaft, said casing having a sidewall extending between said top and bottom walls, a normally open switch mounted on said sidewall having an operating element projecting to a position alongside of said shaft, and a clamp adapted to adjustably embrace said shaft within said casing having a radial cam lobe, said clamp being adjustable on said shaft to position said cam lobe to engage said operating element as said shaft is moved endwise and turned to the selected gear shifting position to close the switch.

2. A steering column mounted switch mechanism adapted to close a circuit only when a gear shifting shaft paralleling said steering column is moved endwise and rotated to a selected gear shifting position, said switch comprising a hollow casing embracing said steering column and said shaft, mounting means within said casing adapted to be constricted on the steering column to mount the casing in a fixed position thereon, said casing including top and bottom walls formed with aligned openings freely passing said gear shifting shaft, said casing having a sidewall extending between said top and bottom walls, a normally open switch mounted on said sidewall having an operating element projecting to a position alongside of said shaft, and a clamp adapted to adjustably embrace said shaft within said casing having a radial cam lobe, said clamp being adjustable on said shaft to position said cam lobe to engage said operating element as said shaft is moved endwise and turned to the selected gear shifting position to close the switch, said clamp being arranged to be positioned on said shaft so that the cam lobe is on a different level from said switch operating element while said shaft is in neutral or in a gear shifting position other than the selected position and so that said shaft is required to be moved endwise to put said cam lobe on a level with said operating element before being rotated in a direction to reach the selected gear shifting position and engage said cam lobe with said operating element in a manner to close said switch.

WALTER L. BYRAM.

REFERENCES CITED

The following references are of record in the file of this patent:

UNITED STATES PATENTS

| Number | Name | Date |
| --- | --- | --- |
| 1,853,513 | Douglas | Apr. 12, 1932 |
| 2,324,819 | Butzbach | July 20, 1943 |